(12) United States Patent
Kelsay

(10) Patent No.: US 6,445,892 B1
(45) Date of Patent: Sep. 3, 2002

(54) PRINTER/SCANNER EMPLOYING PASSIVE HEAT SHIELD

(75) Inventor: Curtis Gregory Kelsay, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/908,291

(22) Filed: Jul. 17, 2001

(51) Int. Cl.[7] .............................................. G03G 15/00
(52) U.S. Cl. ........................................ 399/94; 399/92
(58) Field of Search ............................ 399/91, 92, 93, 399/94, 95, 107, 122; 347/138

(56) References Cited

U.S. PATENT DOCUMENTS 6,266,498 B1 * 7/2001 Oda et al. ..................... 399/92

* cited by examiner

Primary Examiner—Arthur T. Grimley
Assistant Examiner—Hoang Ngo

(57) ABSTRACT

A combined printer/scanner is provided with a passive heat shield between the printer's fuser unit and the scanner's scanning cavity.

4 Claims, 4 Drawing Sheets

PRINTER/SCANNER EMPLOYING PASSIVE HEAT SHIELD

BACKGROUND OF THE INVENTION

1. Field of the Invention.

This invention generally relates to printer/scanner units. More particularly, it is concerned with combined printer/scanner units wherein a scanner is stacked on top of a printer.

2. Description of Related Art.

As use of personal computers and their peripheral equipment has proliferated, the available space on user desktops has become extremely crowded and, hence, valuable. The term "footprint" has, in part, arisen out of concerns for conserving desktop space. Computer and peripheral equipment manufacturers have used various approaches in addressing the desktop crowding problem. These approaches have included stacking schemes (such as stacking a monitor or printer on top of a computer's chassis), combining a mouse and a keyboard in an integral unit and by simply making computers and peripherals narrower and taller.

Manufacturers of scanners also have made strides in reducing the footprints of their products. One approach has been to combine a printer and a scanner in a stacked relationship to create a combined printer/scanner unit. Owing to its size, weight and relative frequency of use, the printer component of a combined printer/scanner unit usually serves as its base. That is to say that the scanner is normally stacked on top of the printer. This stacked relationship presents at least one problem in the case of those printers that employ fuser units (e.g., electrophotographic printers). These fuser units can create heat flux that is large enough to interfere with optimal operation of a stacked scanner. That is to say that stacked output media that has been heated by a fuser can contribute greatly to the heat flux entering a stacked scanner.

Since electrophotographic printers are the most common example of printers having such fuser units, an electrophotographic printer will be used to further illustrate the present invention. Generally speaking, electrophotographic printers employ a laser beam to form an electrical latent image on a charged photoconductor drum. The latent image is then developed with a toner. The resultant toner image is then transferred to a print media substrate such as a sheet of paper. Electrophotographic printers also are especially characterized by the fact that they employ heater/pressure devices (commonly referred to as "fuser units" or "fusers"). Such fuser units normally comprise two opposing rollers that roll over each other in a pressured, rolling contact-creating, relationship. At least one of the two opposing rollers normally contains a heating device such as an electrically powered inductive heater element or halogen tube.

The heat generated by such a fuser unit does not significantly effect the operation of a scanner unit that is separate, distinct and laterally positioned from a fuser-employing printer. It is however well known that the quality of electrophotographic scanning processes can suffer when relatively high temperatures from a printer's fuser are transferred to the scanning cavity of a scanner that is stacked on top of an electrophotographic printer. Thus, when a scanner is stacked on an electrophotographic printer in order to create a footprint-saving printer/scanner unit, the heat generated by the printer's fuser must be dissipated before it reaches the scanner cavity where the actual scanning operation is carried out. Heretofore, such fuser heat dissipation operations have been accomplished through use of cooling fans placed in the vicinity of the fuser within the printer. In effect, these fans expel heat from a printer's inner cavity after that heat has served to soften the toner, but before it has an opportunity to rise (by natural convection) and impinge upon the bottom of a scanner unit that is stacked on top of the printer unit.

This method of preventing fuser-generated heat from reaching a stacked scanner has several drawbacks. For example, the fan(s) used to cool the printer cavity are costly to purchase, install and operate. They also take up valuable printer cavity space. Moreover, they do not adequately deal with another source of heat that reaches a scanner unit that is stacked on a fuser-equipped printer—namely heat from the print media itself. That is to say that a stack of recently fused sheets of print media (e.g., a stack of paper) is itself a significant source of heat. Such a stack of heated print media is generally located outside of the printer cavity (and hence beyond the cooling action of the printer's fan) but, to a large degree, directly underneath the scanner. Thus, heat rises from a stack of recently fused print media and is taken up into the scanner cavity through the bottom of the scanner unit. Again, the presence of relatively high temperatures (e.g., above 150° F.) in a scanner's scanning cavity region serves to lower the print quality performance of such a scanner.

SUMMARY OF THE INVENTION

The present invention provides a stacked printer/scanner unit with improved scanning performance, lower manufacturing costs and lower space and power requirements relative to those stacked printer/scanner units that employ fans to cool their printer cavity. These attributes are attained through applicant's use of one or more passive heat shields. These shields serve to produce scanner cavity operating temperatures that produce relatively high quality scanning operations. Preferably, the scanner cavity of a scanner component of applicant's stacked printer/scanner unit is provided with operating temperatures of less than about 150° F. Scanner cavity operating temperatures of less than 100° F. are even more preferred—and attainable through practice of the present invention. In the more preferred embodiments of this invention, these scanner cavity operating temperatures are produced without the aid of a fan in the printer cavity where the fuser is located, or in the scanner cavity itself. If, however, such fans are employed in applicant's printer/scanner units, they can be relatively smaller than those used in printers that do not follow the teachings of the present invention.

These preferred scanner cavity operating temperatures are provided by hindering entry of fuser-generated heat flux into a stacked scanner's scanner cavity. This heat flux hindering action is obtained by applicant's use of at least one strategically positioned passive heat shield. Such a passive heat shield is located between the printer's fuser unit and a scanning cavity of a scanner that is stacked on top of the printer in order to form a combined printer/scanner unit. For the purposes of this patent disclosure, the term "passive heat shield" can be taken to mean a heat shield that does not have an electrical power input requirement. It also should be appreciated that, for the purposes of this patent disclosure, the term "passive heat shield" should not be taken to mean a housing component of the printer, nor a housing component of the scanner, if in fact such housing(s) are employed in the construction of applicant's combined printer/scanner unit. Hence, a housing bottom (and especially a metallic housing bottom) of a scanner unit or a housing top (and especially a metallic housing bottom) of a printer unit should not be considered a "passive heat shield" under the teachings of this patent disclosure.

Applicant's passive heat shield(s) can comprise a single layer of heat insulating material. A second, third, etc. passive heat shield also can be employed in the practice of this invention as well. These passive heat shields also can comprise two or more distinct layers of heat insulating material. Moreover, any two or more such layers of heat insulating material also can be provided with a gas-containing cavity between such layers. In some of the more preferred embodiments of this invention, the heat shield(s) will form a heat barrier that hinders or prevents heat carrying air currents from arising directly from the fuser to the underside of the scanner cavity. That is to say that applicant's passive heat shield(s) can serve to form a sealed subcavity within the printer cavity and/or a sealed subcavity within the scanner unit. Hence, the term "sealed subcavity" can be taken to mean that said subcavity will not allow air currents to flow, in an unobstructed manner, to a stacked scanner unit.

Sheets of polymeric materials are particularly preferred for making applicant's passive heat shield(s). These sheets will preferably have thicknesses ranging from about 0.040 to about 0.125 inches. Such sheets also are preferably employed in a manner such that they create a subcavity in the printer cavity and/or a subcavity in the scanner that hinders heated air currents from arising directly from the fuser and flowing, in an uninterrupted manner, to the bottom of the scanner unit. The 150–350° F. temperatures produced by most commonly used fuser units generally tend to heat the air that comes into contact with the heat shield to temperatures of about 155 to 160° F. Thus, one of the more important thermal properties of the materials used as passive heat shields in the practice of this invention is their melting temperatures. Heat shields made of sheet metal (steel) or polymeric materials having melting temperatures above about 300° F. are preferred. By way of example only, the following polymeric materials are particularly preferred owing to their possession of the relatively high (i.e., higher than 300° F.) melting temperatures shown in Table I.

TABLE I

|  | melting temp ° F. |
| --- | --- |
| Polystyrene | 350 |
| 6-Nylon | 419 |
| 66-Nylon | 500 |
| Polyster | 500 |
| Polytetrafluoroethylene | 626 |
| Polyarylamides | 716 |

Thus, in its broadest sense, the printer/scanner units of this patent disclosure will comprise: (1) a printer having a fuser unit, (2) a passive heat shield located above the fuser unit and below the scanner and (3) a scanner. In one particularly preferred embodiment of this invention, the scanner unit also will be provided with an automatic sheet feeder device. In another particularly preferred embodiment of this invention a center component will be provided between the printer component and the scanner component of applicant's combined printer/scanner unit. This center component will normally contain a print media output tray that collects and stacks a series of recently fused sheets of print media such as paper. The center component also may contain one or more passive heat shield(s).

DETAILED DESCRIPTION OF THE INVENTION

Figure 1:
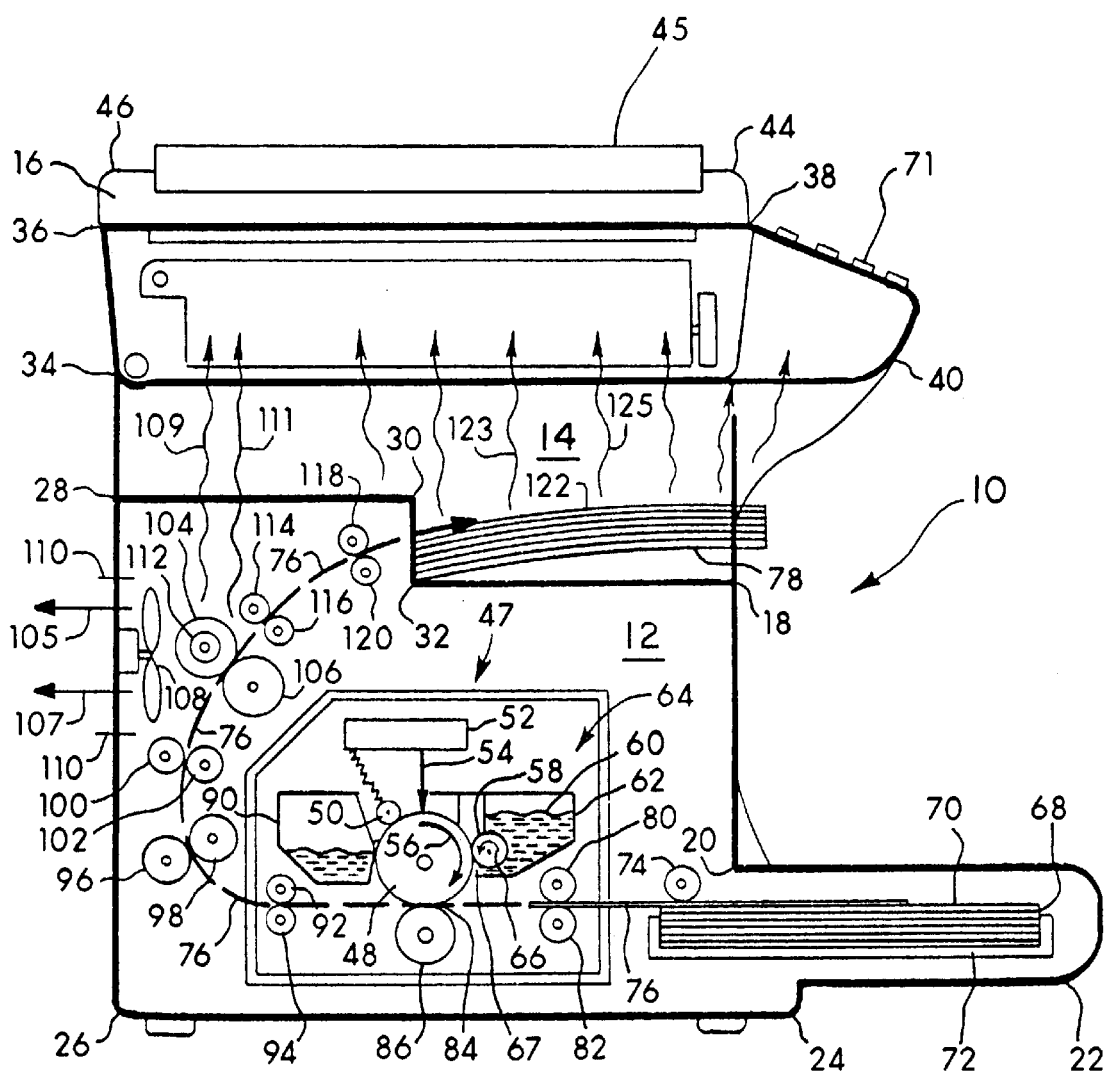
FIG. 1 is a cut-away side view of a prior art, combined printer/scanner unit.

FIG. 1 shows a cut-away side view of a prior art, combined printer/scanner unit 10. It is generally comprised of a printer component 12 and a scanner component 14. Such a printer/scanner unit 10 may further comprise an automatic sheet feeder component 16. The printer component 12 of the printer/scanner unit 10 resides in a printer cavity whose outline is generally defined in FIG. 1 by points 18, 20, 22, 24, 26, 28, 30, 32 and 18. The scanner component 14 of this prior art printer/scanner unit 10 resides in a scanner cavity whose outline is defined by points 18, 32, 30, 28, 36, 38, 40 and 18. An automatic sheet feeder device 16 for the scanner component 14 of the combined printer/scanner unit 10 resides in a automatic sheet feeder cavity whose outline is defined by points 36, 38, 44, 46 and 36. The automatic sheet feeder device 16 includes a tray 45 upon which sheets of printed material are stacked.

The printer component 12 is shown provided with a printing device 47. This printing device 47 is preferably an electrophotographic printing device. It contains a photoconductor drum 48 upon which a latent electrostatic image is placed (and thereafter removed) by any one of several methods well known to the electrophotographic printing arts. By way of example only, a charge roller 50 can be used to charge the surface of the photoconductor drum 48 to a predetermined voltage. A laser scanner 52 emits a laser beam 54 which is pulsed on and off as it is swept across the surface of the photoconductor drum 48 and thereby discharging select portions of said drum surface according to a computer program. The selectively discharged portions of the surface of the drum 48 constitute a latent electrostatic image. The photoconductor drum 48 rotates (e.g., in the clockwise direction suggested by arrow 56) into contact with a developer roller 58.

The developer roller 58 is used to develop the latent electrostatic image in those places where the surface of the photoconductor drum 48 has been selectively discharged by the laser beam 54. Charged magnetic toner particles 60 (stored in a toner hopper 62 of an electrophotographic print cartridge 64), are removed from the toner hopper 62 and placed on the developer roller 58. A magnet (not shown) located within the developer roller 58 magnetically attracts the toner particles 60 to the surface of the developer roller 58. As the developer roller 58 continues to rotate (e.g., in the counterclockwise direction 66 shown in FIG. 1), it arrives at a first toner transfer zone 67. Here, the toner particles 60 on the surface of the developer roller 58 are electrostatically drawn across a gap between the surface of the photoconductor drum 48 and the surface of the developer roller 58—and thereby developing the latent electrostatic image in those areas of the drum 48 that were not discharged by the laser beam 52.

This developed electrostatic image is then ready to be transferred from the photoconductor drum 48 to a sheet of print media such as a sheet of paper. To this end, the printer component 12 is shown provided with a stack 68 of print media such as a stack of sheets of paper. Individual sheets 70 of the stack of print media can be individually unloaded from the top of said stack 68. To this end, the stack 68 is appropriately positioned on a print media holding tray 72. A pickup roller 74 located over the top leading edge of a given top sheet 70 of the stack 68 removes successive top sheets from said stack. Such a sheet of print media 70 then follows a media transport path 76 defined within the electrophotographic printer 12 by an array of media handling devices such as rollers, belts, side plate guides and the like. FIG. 1 also shows that such a sheet of print media 70 is ultimately delivered to a sheet-stacking output tray 78. This output tray 78 lies outside of printer cavity. That is to say that the output tray 78 lies above the top surface (18, 32, 30 and 28) of the printer component 12.

The media transport path 76 may, however, vary somewhat. For example, after being introduced into such a printer component 12, a given sheet of print media 70 may move through drive rollers 80/82 in a manner so adapted and arranged that arrival of the leading edge of a given sheet of print media 70 at a second toner transfer zone 84 is synchronized with rotation of the photoconductor drum 48. Thus, a region on the surface of the drum 48 carrying a latent electrostatic image can be associated with a specific region on the sheet of print media 70. As the photoconductor drum 48 continues to rotate (e.g., in clockwise direction 56), those portions of the photoconductor drum 48 having toner particles 60 adhering to the discharged areas of the drum's surface are transferred to select regions of the print media 70 and thereby define an image on the sheet of print media.

In order to accomplish this toner transfer, the sheet of print media 70 passes over a toner transfer roller 86 and under the photoconductor drum 48. Thus, the space between the bottom of the drum 48 and the top of the transfer roller 86 may be regarded as a second toner transfer zone 84 of the printing device 47. In this second transfer zone 84, the transfer roller 86 electrostatically attracts toner particles 60 away from the surface of the photoconductor drum 48 and onto the top surface of the print media 70. Thus, the sheet becomes a "printed" sheet. This transfer of toner particles 60 from the surface of the photoconductor drum 48 to the top surface of the print media 70 does not, however, occur with one hundred percent efficiency. That is to say that some of the toner particles may remain on the surface of photoconductor drum 48. As the photoconductor drum 48 continues to rotate, those untransferred toner particles that continue to adhere to the surface of the drum 48 are removed by a cleaning blade 88 and deposited in a toner waste hopper 90. Having had these untransferred toner particles wiped from its surface, the photoconductor drum 48 is again ready to be charged by charge roller 50 and thereby complete the photoconductor drum's rotation cycle.

Meanwhile, as the print media 70 moves further along the media path 76 (i.e., past photoconductor drum 48 and transfer roller 86), a series of rollers e.g., 92/94, 96/98, and 100/102 (and/or other sheet handling devices) delivers the image-carrying sheet of print media to a fuser or heater roller/pressure roller device 104/106. Here, the print media 70 passes between a fuser or heater roller 104 and a pressure roller 106 under conditions of both heat and pressure. Preferably, the pressure roller 106 component of this device 104/106 provides a powered, pressured rolling interface between the two rotating roller surfaces. It also provides a motive force that pulls the print media 70 through the fuser roller/pressure roller interface.

Those skilled in the electrophotographic printing arts will appreciate that such a fuser/pressure operation is essential to virtually all electrophotographic printing processes. In it, the toner material that was transferred, in imagewise fashion, from the photoconductor drum 48 onto the print medium 70 is fixed (by a combination of heat and pressure) to form a permanent image on the print medium. The heater or fuser component 104 of the fuser/pressure device 104/106 serves to soften the toner particles so that fusing of the toner material to the sheet of print media (e.g., paper) can occur at relatively low pressures. In effect the combined heat and pressure conditions produced by the fuser/pressure device 104/106 force the toner material into the fabric of a sheet of paper print media.

The temperature and pressure conditions existing in such fuser/pressure devices (e.g., fuser/pressure device 104/106) can vary considerably. Preferably, such variation is made through software at a computer which then effects heat and pressure changes. Generally speaking, the temperature of the surface of the heater roller 104 of such a fuser unit is designed to soften (but not melt) particles of the toner material. The temperatures needed to do this generally vary between about 150 and about 350° F. Temperatures between about 250 and 350° F. are however somewhat preferred in those cases where polymer based toner particles are employed.

Unfortunately, the 150 to 350° F. temperatures needed to soften the toner particles is considerably higher than the temperatures at which scanning operations are preferably carried out. Scanner cavity temperatures of less than 100° F. are preferred. Those between 70 and 85° F. are especially preferred. In order to obtain these more preferred scanner cavity temperatures, the electrophotographic printer cavity of such a prior art printer/scanner unit 10 is provided with an electric fan 108. In effect, such a fan 108 expels heat flux from the printer cavity (through a heat vent 110) in a side (e.g., side 26–28) of the printer housing. This heat expulsion is generally depicted by arrows 105 and 107. That is to say that the heat flux from the fuser roller 104 is expelled through the vent 110 before said heat flux can rise (e.g., by natural convection such as that suggested by arrows 109 and 111) and thereby raise the temperature of the underside of the scanner (and eventually the scanner cavity). Generally speaking, such a fan 108 is positioned so that it does not blow directly upon the heater roller 104 (and hence partially defeat the toner heating purpose of said heater roller 104), but rather removes heat from the vicinity of the fuser roller 104 after such heat has served to soften the toner. Again, only the most basic architecture of such a heater roller 104 is shown in FIG. 1. Its heat source 112, such as an induction heater element or a halogen lamp, is preferably mounted in a hollow, center shaft of such a heater roller 104.

The pressure conditions experienced by a sheet of print media, and especially a sheet of paper, will generally range between about 50 and about 500 psi. The variation in pressures at the heater roller 104/pressure roller 106 interface can be controlled by devices that serve to move a journal in which an axle of the pressure roller (and/or heater roller) operates. Pressures ranging between about 400 and about 480 psi are preferred, especially when paper is the print media and the fuser temperature is between about 300° F. and about 350° F.

The residence time of a sheet of print media in such a pressure/heater device 104/106 is largely determined by the angular velocity of a powered pressure roller 106. Typical residence times for an 8½×11 inch sheet of paper will be from about 2 to about 8 seconds. Residence times of about 3 to about 6 seconds are somewhat preferred. These residence times generally correspond to 8½×11 inch paper processing rates of about 16 to about 32 sheets per minute.

Generally speaking, the shorter residence times will be used as the operating temperature is raised. For example, the lower end of the residence time range (e.g., 2–3 seconds) will generally be preferred as the temperature is raised to the upper regions of its range (e.g., to about 250–350° F).

Thus, a combination of heat from the fuser roller 104, pressure from the pressure roller 106 and regulation of the residence time in the heater/pressure device 104/106 serve to fix the toner and thereby form a permanent image on a sheet of print media 70. After the fusing operation has been completed, an output roller system (e.g., roller systems 114/116 and 118/120) conveys the fused print media 70 further along the print media transport path 76 and eventually deposits such a sheet 70 in the sheet stacking media output tray 78 previously noted. Preferably, this tray 78 lies completely outside the housing of the printer 12 for easy manual access to the finished printed product. This output tray 78 collects a series of recently fused sheets of print media in a stack 122 of such print media. The heat flux that arises from a stack 122 of recently fused sheets is generally suggested by arrows 123, 125, etc. This stack 122 is generally beyond the cooling action produced by the fan 108 in the printer cavity. That is to say that the stack 122 is not cooled to any great extent by the fan 108 because the output tray 78 is outside of the printer cavity. Hence, heat flux 123, 125, etc. arising from the recently fused sheets in the stack 122 rises by natural convection and thereby impinges upon the underside of the scanner component 14. This circumstance serves to heat the underside of scanner—and eventually the scanner cavity itself.

Figure 2:
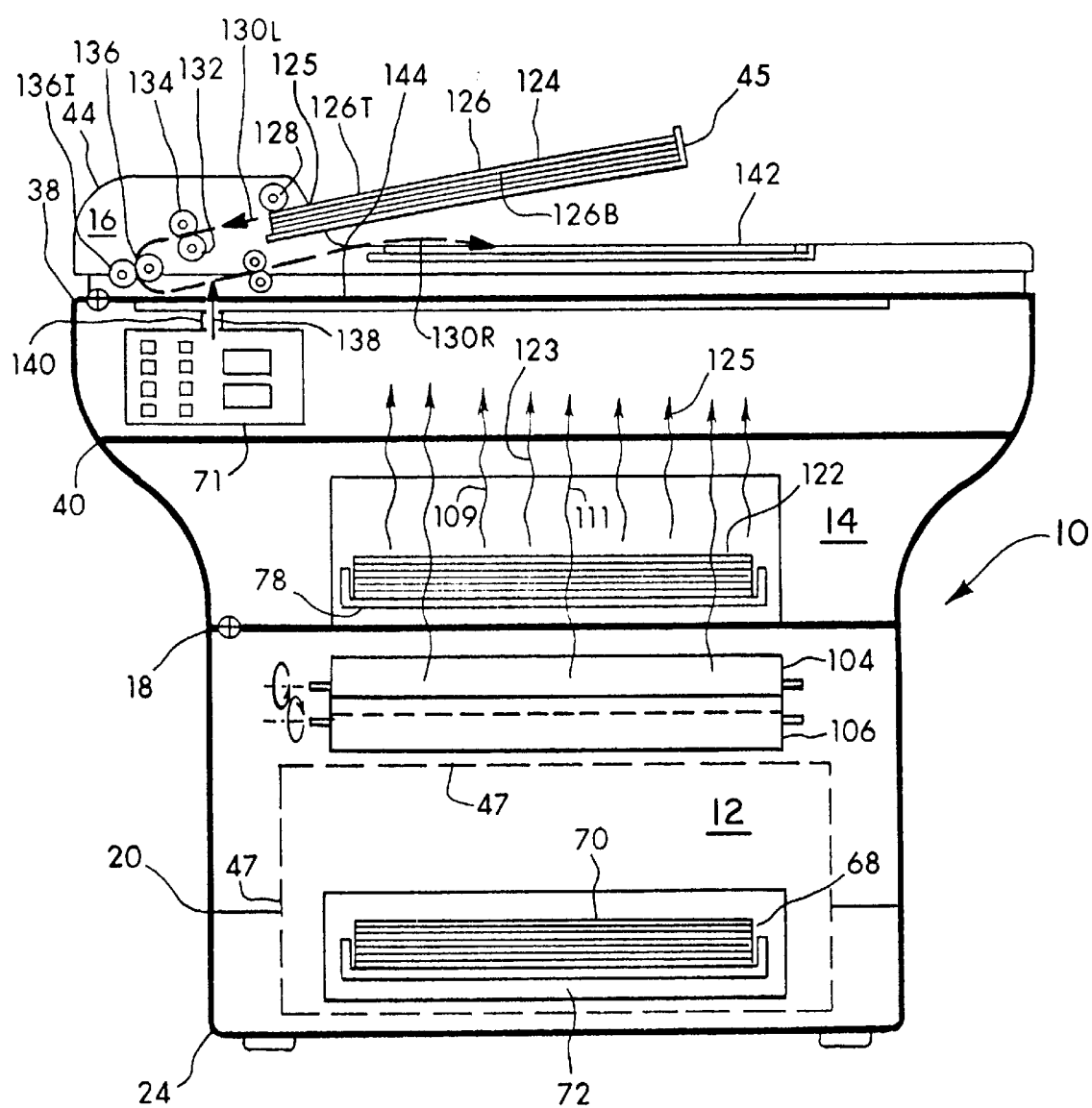
FIG. 2 is a cut-away front view of the prior art, combined printer/scanner shown in FIG. 1.

FIG. 2 is a partially cut away front view of the prior art printer/scanner 10 shown in FIG. 1. Aside from the elements discussed with respect to the side view of FIG. 1, the front view depicted in FIG. 2 shows the sheet handling operations carried out by the automatic sheet feeder device 16. This device 16 includes a tray 45 that slopes downward so that a stack of print media 124 (e.g., a stack of paper), placed in the tray 45, is urged (under the influence of gravity) toward a receiving port 125 in the right side of the feeder device 16. Any given top sheet 126 of the stack also can be thought of as having a top side 126T and a bottom side 126B. Normally the top side 126T will contain printing that is to be scanned by the scanner unit 16. A sheet acquisition mechanism (e.g., pick roller 128) is positioned with respect to the receiving port 125 so that said pick roller 128 can pull successive top sheets of printed material from the stack of print media and thereby sequentially remove them from the top of the stack 124. Such a sheet of paper could however just as well be removed from the bottom of the stack 124 by other sheet acquisition devices known to this art.

In either case, a given top sheet of paper 126 is first conveyed, in the rightward direction suggested by arrow 130L, by sheet transport devices (such as sheet transport rollers 132/134), to the outside surface of a cylindrical, powered, roller 136. Such a powered roller turns a given sheet 126 over so that information contained on its top side 126T can be scanned by scanning rays 138 delivered to the sheet by a scanner device 140. Thus, an image on the top 126T of the sheet 126 is scanned and data gained from such scanning processed (e.g., stored in a computer, put on display on a computer monitor or transmitted), in ways well known to the print scanning arts. The scanned sheet is then sent in the rightward direction generally suggested by arrow 130R. Eventually, the sheet 126 is delivered to a sheet collection device 142.

Figure 3:
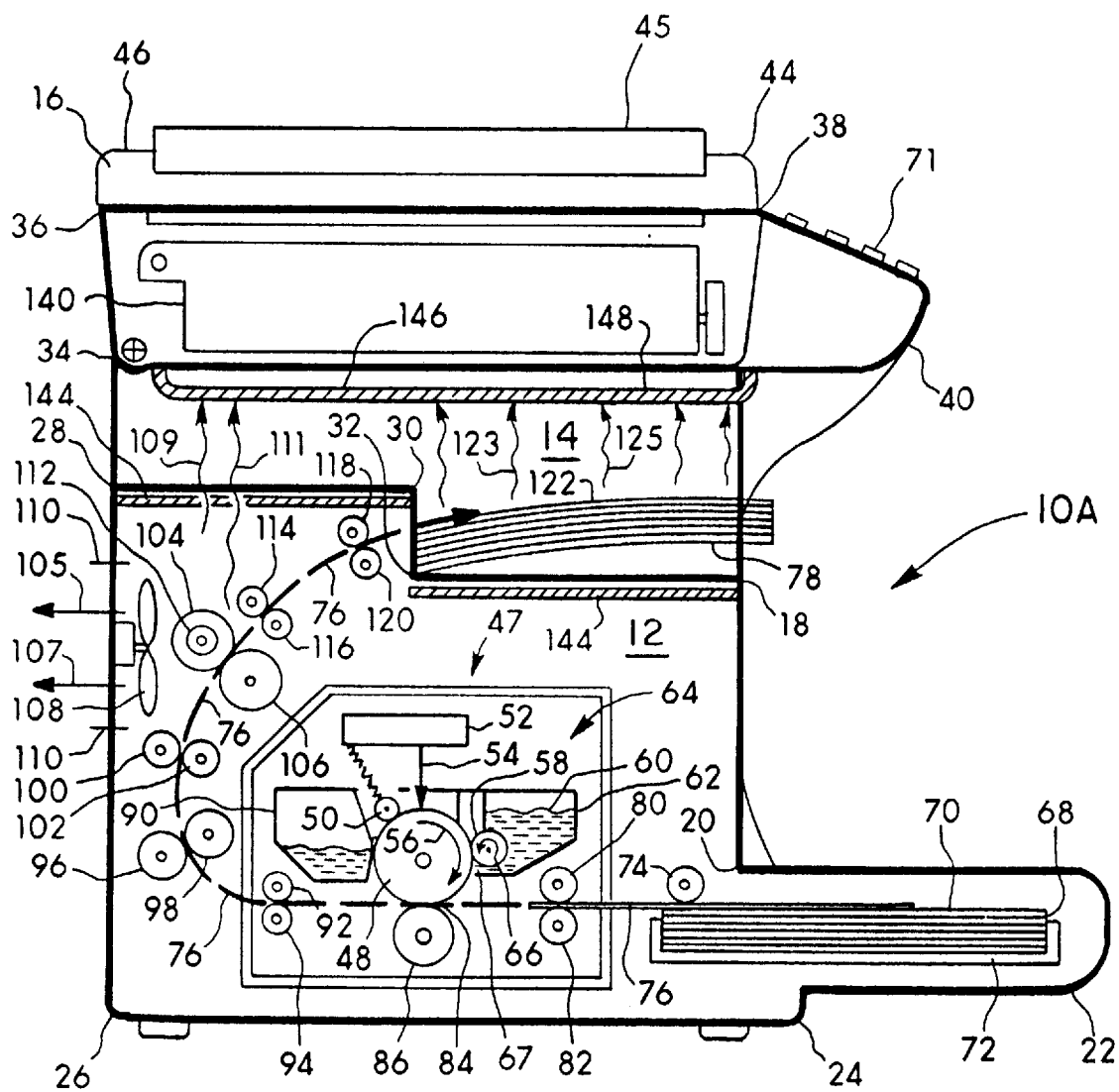
FIG. 3 is a cut-away side view of a combined printer/scanner unit made according to the teachings of this invention.

FIG. 3 shows a cut-away side view of a combined printer/scanner 10A made according to the teachings of the present invention. For the sake of illustration and/or comparison, the combined printer/scanner 10A is depicted as being similar to the printer/scanner 10 shown in FIG. 1. Printer/scanner 10A is however further characterized by its possession of at least one passive heat shield 144 located between the printer's fuser unit 104 and its scanner component (the outline of which is generally depicted by points 18, 32, 30, 28, 36, 38, 40 and 18). As was previously noted, the term "passive heat shield" should not be taken to mean a housing component of the printer, nor a housing component of the scanner. Thus, if the printer component 12 had an upper housing surface (e.g., a housing surface generally running along the lines defined by points 28, 30, 32 and 18), then applicant's passive heat shield would not be that upper housing surface. In other words, applicant's passive heat shield 144 primarily fulfills a heat shield function rather than a housing function. In FIG. 3, the passive heat shield 144 is depicted as having a left portion that generally extends along the length of the line between points 28 and 30. FIG. 3 also shows a second or right portion of the passive heat shield 144 that generally extends along the length of the line between points 32 and 18. Obviously the passive heat shield 144 should not block the media path 76 leading from the heater/pressure device 104/106 to the collection tray 78.

FIG. 3 also illustrates the presence of an another passive heat shield 146. It too is located above the fuser 104. More specifically it is located within the scanner unit 14 in a_horizontal plane that lies above the top surface of the printer 12 (again defined by points 28, 30, 32, and 18) and below a scanner unit 140 (see FIG. 4) contained in the scanner component 14. This second passive heat shield 146 can serve in place of the first passive heat shield 144, or it can perform a passive heat shield function in addition to that performed by the first passive heat shield 144.

In a particularly preferred embodiment of this invention, the additional passive heat shield 146 (in conjunction with a bottom surface of the scanner e.g., defined by connecting points 34 and 40) forms a subcavity in said scanner 14. For example, FIG. 3 depicts the additional passive heat shield 146 having an elongated U-shaped configuration that forms an air cavity 148 between a bottom surface (e.g., between points 34 and 40) of the scanner 14 and the additional passive heat shield 146. The curled up or U-shaped forming ends of the additional passive heat shield 146 are shown abutting against the underside of the scanner surface generally running along the line defined between points 34 and 40. This arrangement creates a void space 148 between the second passive heat shield 146 and a scanner surface defined between points 34 and 40. This void space 148 preferably contains a gas such as air which also serves as a thermal insulator.

In another particularly preferred embodiment of this invention, the scanner cavity (which is generally defined by points 18, 32, 30, 28, 36, 28, 40 and 18) is subdivided into a center section (generally defined by points 28, 30, 32, 18, 40, 34 and 28) and a scanner top section having a scanner cavity that lies within the surfaces defined by connecting points 40, 34, 36, 38 and 40. That is to say that a preferred printer/scanner 10A will be comprised of (1) a scanner (generally lying within the surfaces defined by connecting points 40, 34, 38 and 40) stacked upon a center section, (2) a center section (generally lying within the surfaces defined by points 28, 30, 32, 18, 40, 34 and 28) stacked upon a printer and (3) a printer (generally lying within the surfaces defined by connecting points 18, 20, 22, 24, 26, 28, 30, 32 and 18) that serves as a base for the printer/scanner unit 10A. As was previously noted, the scanner is preferably further provided with an automatic sheet feeder device 16 (see FIG. 4).

Figure 4:
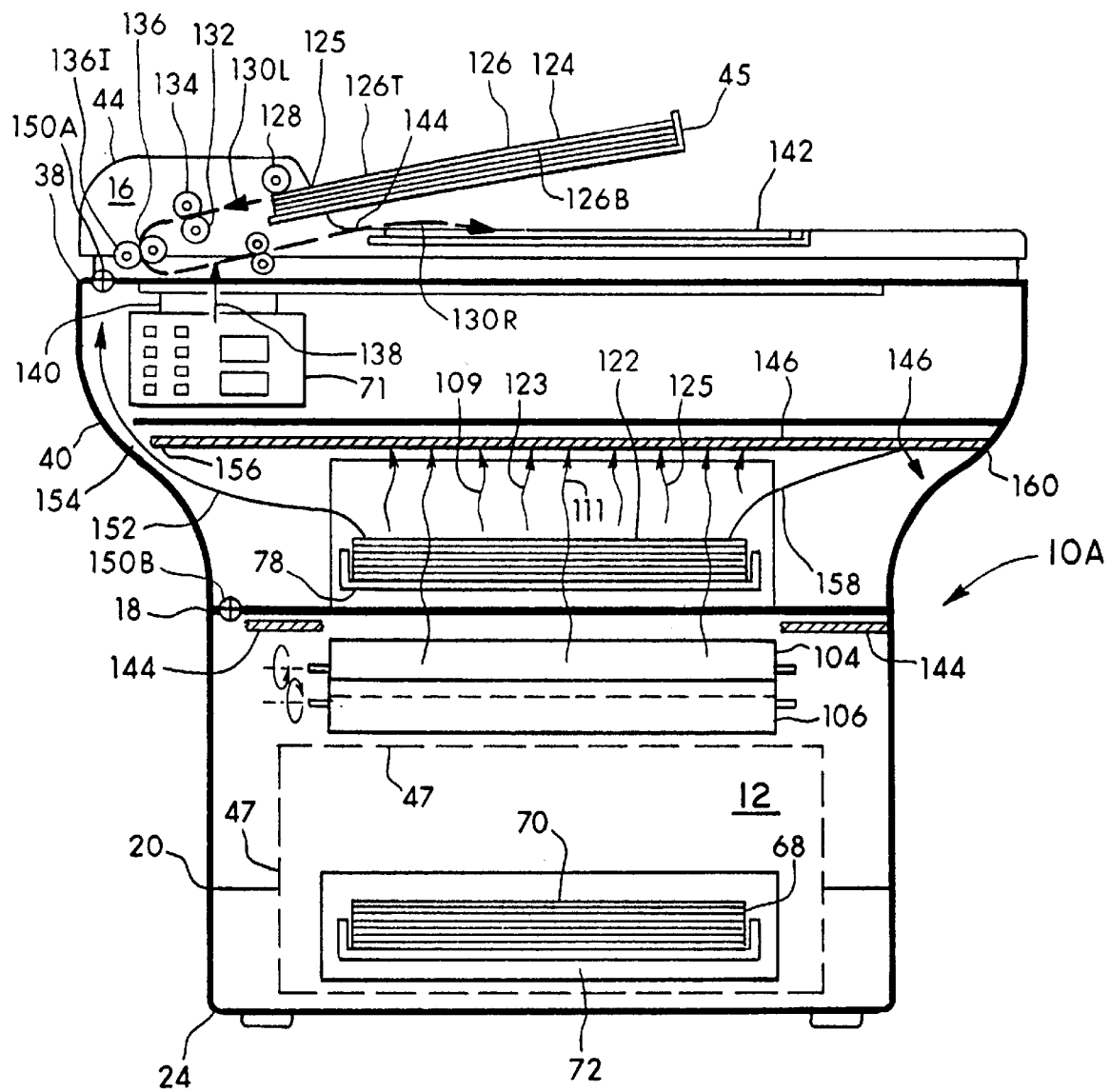
FIG. 4 is a cut-away front view of the combined printer/scanner unit of FIG. 3.

FIG. 4 is a partially cut away front view of the printer/scanner 10A shown in FIG. 3. Aside from the elements discussed with respect to FIG. 3, the front view depicted in FIG. 4 shows certain other preferred embodiments of the passive heat shields 144 and 146. For example, FIG. 4 depicts how these components can be mechanically attached to each other by any one of several kinds of holding, hinging or locking devices known to those skilled in this art. By way of example only FIG. 4 depicts rod type hinging devices 150A and 150B that respectively serve to mechanically interconnect the scanner to the center section and the center section to the printer.

FIG. 4 also depicts an arrow 152 generally arising from the left side of the stack 122 of print media. This arrow 152 generally represents a hot air current that flows generally upward from the stack 122. It passes through a gap 154 between the left end 156 of the passive heat shield 144 and the left side of the scanner. The general flow of arrow 152 from the top of the stack 122 of print media toward the underside of the scanner 140 may be regarded as unobstructed air flow. That is to say that the flow of hot air currents (such as that suggested by arrow 152) from the stack 122 does not impinge upon the passive heat shield 146 in the region where the gap 154 is located. This circumstance is presented for purposes of illustrating applicant's term "unobstructed" air flow. It is not a preferred embodiment of this invention.

This unobstructed air flow pattern is to be contrasted with the path taken by another hot air current 158 that is shown arising from the right side of the stack 122. This other hot air current 158 is shown impinging on the underside of the passive heat shield 146. That is to say that the hot air current 158 does not flow upward in an "unobstructed" manner because the right side of the passive heat shield 146 extends to (and firmly abuts against) the right side wall 160 of the scanner. Again, in the more preferred embodiments of this invention, the left side of the passive heat shield 146 will extend to the left side of the scanner in the same manner that the right side of the passive heat shield 146 extends to the right side 160 of the scanner. In such an arrangement the passive heat shield 146 will create a subcavity in the printer/scanner 10A that serves to hinder heat flux from the fuser 104 from arising above the horizontal plane of the passive heat shield 146 and impinging in an unobstructed manner upon the underside of the scanner 140.

The foregoing description of the present invention has been presented for purposes of illustration only. It is not intended to be exhaustive or to limit the invention to the precise forms disclosed herein. Thus, the appended claims can be construed to include other alternative embodiments of this invention not otherwise limited by the prior art.

I claim:

1. A printer/scanner comprising a printer that resides in a printer cavity, a center section stacked upon the printer cavity and a scanner stacked upon the center section and wherein said printer cavity is separated from the center section by a first passive heat shield placed on a top side housing component of the printer cavity and wherein an underside housing component of the scanner is provided with a second passive heat shield so adapted and arranged that said second passive shield hinders heat carrying air currents from arising directly from print media in a print media tray in the center section.

2. A printer/scanner comprising a printer that resides in a printer cavity, a center section stacked upon the printer cavity and a scanner stacked upon the center section and wherein said printer cavity is separated from the center section by a first passive heat shield placed on a top side housing component of the printer cavity and wherein an underside housing component of the scanner is provided with a second passive heat shield and wherein the first and second passive heat shields are each made of a polymeric material having a thickness ranging from about 0.040 to about 0.25 inches.

3. The printer/scanner comprising an electrophotographic printer having a fuser that resides in a printer cavity whose top is provided with a first passive heat shield attached to a top surface of a housing for said printer cavity, a center section stacked on the printer cavity and a scanner stacked on the center section, and wherein said scanner is separated from the center section by a second passive heat shield placed between said scanner and said center section and wherein the printer/scanner is provided with a print media feed tray on the same side of the printer/scanner as a print media output tray located in the center section.

4. A printer/scanner comprising an electrophotographic printer having a fuser that resides in a printer cavity whose top is provided with a first passive heat shield attached to a top surface of a housing for said printer cavity, a center section stacked on the printer cavity and a scanner stacked on the center section, and wherein said scanner is separated from the center section by a second passive heat shield placed between said scanner and said center section and wherein the first and second passive heat shields are each made of a polymeric material having a thickness ranging from about 0.040 to about 0.125 inches.

* * * * *